US010732276B2

(12) United States Patent
Blech (10) Patent No.: US 10,732,276 B2
(45) Date of Patent: Aug. 4, 2020

(54) SECURITY SYSTEM, METHOD AND DEVICE (71) Applicant: SONY CORPORATION, Tokyo (JP)

(72) Inventor: Marcel Blech, The Hague (NL)

(73) Assignee: SONY CORPORATION, Tokyo (JP)

(*) Notice: Subject to any disclaimer, the term of this patent is extended or adjusted under 35 U.S.C. 154(b) by 332 days.

(21) Appl. No.: 15/029,139

(22) PCT Filed: Oct. 21, 2014

(86) PCT No.: PCT/EP2014/072534
§ 371 (c)(1),
(2) Date: Apr. 13, 2016

(87) PCT Pub. No.: WO2015/059132
PCT Pub. Date: Apr. 30, 2015

(65) Prior Publication Data
US 2016/0259047 A1 Sep. 8, 2016

(30) Foreign Application Priority Data

Oct. 21, 2013 (EP) .................................... 13189475

(51) Int. Cl.
G01S 13/90 (2006.01)
G01S 13/88 (2006.01)
(Continued)

(52) U.S. Cl.
CPC ................ *G01S 13/90* (2013.01); *G01S 7/02* (2013.01); *G01S 13/887* (2013.01); *G01S 13/89* (2013.01);
(Continued)

(58) Field of Classification Search
CPC .................................. G01S 13/90; G01S 7/02
(Continued)

(56) References Cited

U.S. PATENT DOCUMENTS 6,150,974 A   11/2000 Tasaka et al.
6,388,621 B1* 5/2002 Lynch ................... H01Q 1/125
                                                343/700 MS
(Continued)

FOREIGN PATENT DOCUMENTS

WO   WO 2010/032003 A1   3/2010
WO   WO-2010032003 A1 *  3/2010 ............. G01V 8/005
(Continued)

OTHER PUBLICATIONS

Y. Tursunjan, "A Study on the Efficiency of Transparent Patch Antennas Designed From Conductive Oxide Films", Antennas and Propagation (APSURSI), 2011 IEEE International Symposium on, IEEE, Jul. 3, 2011, pp. 3085-3087, (Year: 2011).*

(Continued)

Primary Examiner — Peter M Bythrow
Assistant Examiner — Helena H Seraydaryan
(74) Attorney, Agent, or Firm — Xsensus LLP (57) ABSTRACT A security system comprises a line array of antenna elements configured to transmit electromagnetic radiation and to receive scattered electromagnetic radiation scattered back from an object and an automatic movement element that automatically moves between at least two positions to perform a predetermined function. Said line array is mounted to said automatic movement element to transmit electromagnetic radiation to and receive scattered electromagnetic radiation from a screening area in front of and/or behind the automatic movement element. A controller controls said antenna elements to transmit electromagnetic radiation and to receive scattered electromagnetic radiation at a plurality of positions of the automatic movement element. A processor processes scattered electromagnetic radiation received at a plurality of positions of the automatic movement element and generates image information of the (Continued)

screening area using position information about the plurality of positions of the automatic movement element at which scattered electromagnetic radiation is received and used for processing. The automatic movement element is an automatic door that automatically opens and closes or an advertisement board that automatically changes between two or more advertisements. The automatic movement element is an automatic door that automatically opens and closes or an advertisement board that automatically changes between two or more advertisements.

17 Claims, 6 Drawing Sheets

(51) Int. Cl.
  *G01V 8/00* (2006.01)
  *H01Q 9/04* (2006.01)
  *H01Q 13/20* (2006.01)
  *H01Q 21/08* (2006.01)
  *G01S 13/89* (2006.01)
  *G01S 7/02* (2006.01)

(52) U.S. Cl.
  CPC ............ *G01V 8/005* (2013.01); *H01Q 9/0407* (2013.01); *H01Q 13/206* (2013.01); *H01Q 21/08* (2013.01)

(58) Field of Classification Search
  USPC .......................................................... 342/22
  See application file for complete search history.

(56) References Cited

U.S. PATENT DOCUMENTS

| | | | |
|---|---|---|---|
| 7,103,078 B2 | 9/2006 | Perry et al. | |
| 7,349,074 B2 | 3/2008 | Zambon | |
| 7,609,196 B2 | 10/2009 | Jeck et al. | |
| 7,900,398 B2 | 3/2011 | Liles, Jr. | |
| 2003/0103006 A1* | 6/2003 | Yamada | H01L 23/66 343/700 MS |
| 2004/0140924 A1* | 7/2004 | Keller | G01N 21/3581 342/22 |
| 2005/0093733 A1 | 5/2005 | Lovberg et al. | |
| 2010/0097290 A1* | 4/2010 | Legay | H01Q 3/20 343/880 |
| 2010/0265117 A1* | 10/2010 | Weiss | G01S 13/003 342/22 |
| 2011/0163231 A1 | 7/2011 | Salmon | |
| 2011/0234808 A1 | 9/2011 | Löffler | |
| 2011/0240007 A1* | 10/2011 | Currier | F24J 2/40 126/606 |
| 2013/0019534 A1* | 1/2013 | Ressel | E05F 15/603 49/358 |
| 2013/0293436 A1 | 11/2013 | Blech | |
| 2017/0236458 A1* | 8/2017 | Kim | E06B 7/00 52/31 |

FOREIGN PATENT DOCUMENTS

WO WO 2012/100885 A1 8/2012
WO WO 2014/032984 A1 3/2014

OTHER PUBLICATIONS

International Search Report dated Apr. 10, 2015 in PCT/EP2014/072534.
Stefan A. Lang, et al; "A New Approach for Fast Security Scanning with Millimeter-Waves: SARGATE", Proc. of SPIE, vol. 8022, 2011, pp. 802208-1-802208-7 and English Abstract.
S. Ahmed et al., "Advanced Microwave Imaging", IEEE Microwave Magazine, vol. 13, No. 6, Sep. 2012, pp. 26-43.
T. Yasin et al., "A Study on the Efficiency of Transparent Patch Antennas Designed from Conductive Oxide Films", Proc. of Antennas and Propagation Symposium 2011, Jul. 2011, pp. 3065-3087.
N. Guan et al., "Antennas Made of Transparent Conductive Films", PIERS online, vol. 4, No. 1, Jan. 2008, pp. 116-120.
Yasin et al., "A Comparative Study on Two Types of Transparent Patch Antennas", Proc. of URSI General Assembly and Scientific Symposium, 2011, Aug. 2011, 4 pages.
Chan, Y.K. et al., "An Introduction to Synthetic Aperture Radar (SAR)", Progress in Electromagnetics Research B., vol. 2, 2008, pp. 27-60.

* cited by examiner

SECURITY SYSTEM, METHOD AND DEVICE

CROSS-REFERENCE TO RELATED APPLICATIONS

The present application is based on PCT filing PCT/EP2014/072534 filed Oct. 21, 2014, and claims priority to European Patent Application 13189475.0 filed by the European Patent Office on Oct. 21, 2013, the entire contents of each of which being incorporated herein by reference.

BACKGROUND

Field of the Disclosure

The present disclosure relates to a security system, a security device and corresponding methods.

Description of Related Art

There exist many companies, whose business are mm-wave based security systems. One major application is screening of people on airports or other public places for weapons or bombs. Normally, dedicated portal systems are being used for imaging. These systems scan the person by either employing some sort of 2/3D electronic beamforming or by moving an antenna around the person and applying some synthetic aperture radar (SAR) processing. Such a system is e.g. known from U.S. Pat. No. 7,710,307 B2.

One drawback of these portal based scanners is their large size. A specific area needs to be provided for the device. Furthermore, people have to queue up in front of the portal. As a consequence it is obvious to everybody that he or she are being scanned.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a system, device and method that can be require less space and that enable scanning of people less obviously. It is a further object to provide a corresponding computer program for implementing the disclosed method and a non-transitory computer-readable recording medium for implementing the disclosed method.

According to an aspect there is provided a security system comprising:

a line array of antenna elements configured to transmit electromagnetic radiation and to receive scattered electromagnetic radiation scattered back from an object, an automatic movement element that automatically moves between at least two positions to perform a predetermined function, said line array being mounted to said automatic movement element to transmit electromagnetic radiation to and receive scattered electromagnetic radiation from a screening area in front of and/or behind the automatic movement element, a controller configured to control said antenna elements to transmit electromagnetic radiation and to receive scattered electromagnetic radiation at a plurality of positions of the automatic movement element, and a processor configured to process scattered electromagnetic radiation received at a plurality of positions of the automatic movement element and to generate image information of the screening area using position information about the plurality of positions of the automatic movement element at which scattered electromagnetic radiation is received and used for processing.

According to a further aspect there is provided a security device for use in a disclosed system, said security device comprising:

a line array of antenna elements configured to transmit electromagnetic radiation and to receive scattered electromagnetic radiation scattered back from an object, mounting means configured to mount said line array to an automatic movement element that automatically moves between at least two positions to perform a predetermined function to transmit electromagnetic radiation to and receive scattered electromagnetic radiation from a screening area in front of and/or behind the automatic movement element, a controller configured to control said antenna elements to transmit electromagnetic radiation and to receive scattered electromagnetic radiation at a plurality of positions of the automatic movement element, and a processor configured to process scattered electromagnetic radiation received at a plurality of positions of the automatic movement element and to generate image information of the screening area using position information about the plurality of positions of the automatic movement element at which scattered electromagnetic radiation is received and used for processing.

According to a further aspect there is provided a security method comprising:

transmitting electromagnetic radiation by a line array of antenna elements mounted to an automatic movement element that automatically moves between at least two positions to perform a predetermined function, said electromagnetic radiation being transmitted to a screening area in front of and/or behind the automatic movement element, receiving scattered electromagnetic radiation scattered back from an object from the screening area, controlling said antenna elements to transmit electromagnetic radiation and to receive scattered electromagnetic radiation at a plurality of positions of the automatic movement element, and processing scattered electromagnetic radiation received at a plurality of positions of the automatic movement element and generating image information of the screening area using position information about the plurality of positions of the automatic movement element at which scattered electromagnetic radiation is received and used for processing.

According to a further aspect there is provided a method for use in a disclosed system, said method comprising:

controlling antenna elements of a line array of antenna elements mounted to an automatic movement element that automatically moves between at least two positions to perform a predetermined function to transmit electromagnetic radiation to a screening area in front of and/or behind the automatic movement element and to receive scattered electromagnetic radiation from an object from the screening area at a plurality of positions of the automatic movement element, and processing scattered electromagnetic radiation received at a plurality of positions of the automatic movement element and generating image information of the screening area using position information about the plurality of positions of the automatic movement element at which scattered electromagnetic radiation is received and used for processing.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the disclosed security device, the disclosed methods, the disclosed computer program and the disclosed computer-readable recording medium have similar and/or identical preferred embodiments as the claimed security system and as defined in the dependent claims.

One of the aspects of the disclosure is to integrate a line array of antenna elements into an automatically moving movement element, such as a sliding door, a revolving door or a hinged door, as e.g. commonly installed in the entrance area of public buildings. Using the inherent movement of such automatically moving movement elements, no additional means like a motor or actuator is needed to move the antenna elements for scanning a screening area. Instead the automatic movement of the movement element is exploited concurrently to move the line array of antenna elements in order to scan the screening area. In this context, the automatic movement between at least two positions shall be understood in a way that it does not only include a movement between exactly two positions, but also includes movements between several different positions and rotational movement in which the movement element rotates about a rotational axis.

By use of knowledge about the positions of the antenna elements at which electromagnetic radiation has been emitted and received a 2D and/or 3D image of the screening area can be generated although only a 1D line array of antenna elements is used for emission and reception of electromagnetic radiation. For this purpose, various algorithms may be employed, such as a conventional (digital) beamforming algorithm, a Synthetic Aperture Radar (SAR) algorithm (includes different existing numerical implementations) or a combination thereof. The knowledge about the positions of the antenna elements may, for instance, be obtained from knowledge about the trajectory and the speed of movement of the antenna elements, which in turn may be obtained from known or measured information about the movement (in particular movement speed) of the automatic movement element. This reduces the complexity of the hardware, and the number of channels between the controller, the processor and the antenna elements can be reduced significantly compared to a 2D array of antenna elements.

Preferably, optically transparent antennas, e.g. made of indium tin oxide (ITO) films or metal mesh structures sputtered on flexible glass or thin polymer films, are used as antenna elements, which are attached to the movement element(s), which are commonly made of glass. This provides the advantage that nobody can easily identify the antenna elements and the people screened in the screening area do generally not know or recognize immediately that they are scanned.

As the line array of antenna elements is integrated into automatic movement elements, which are installed in many public building, there is no need for additional portal type security systems. This can help saving space and staff for operating the portal type security systems.

Further, the line array of antenna elements can be retrofitted to existing movement elements (e.g. doors) to equip them with advanced intelligence for people screening. As existing automatic movement elements generally do not provide any information about the movement of the movement element, this information may be easily obtained by rather simple additional means that can be easily installed, e.g. by using a laser distance sensor, which tracks the position with respect to a fixed optical reflector periodically.

The integration of line array of antenna elements is not limited to doors at the entrance of a building (such as airports, schools, hotels, train stations, police buildings, court houses, etc.). It can also be installed to doors of elevators, trains, subways, busses etc. Further, it can be integrated into any device, which has an inherent mechanical movement. There are e.g. advertisement boards in public places, which are mechanically changed by rolling a paper film up and down (or left and right) showing different types of advertisements. The line array of antenna elements could be moved up and down as well using some mechanics to couple the antenna elements to the mechanics of the advertisement board.

Such automatically moving elements like doors or advertisement boards are commonly referred to as "automatic movement elements" herein. They have generally in common that they perform a predetermined function (e.g. a door performs the function to open and close an entrance and thus to grant or deny access to e.g. a building; an advertisement board performs the function to alternatingly display different advertisements) different from the function of moving the antenna elements, and that they provide an inherent automatic movement in order to perform the predetermined function. Other examples may be a rotating advertising pillar or a railway crossing gate.

Further, there is generally no limitation on the size, type and number of antenna elements used in such a line array. A reasonable size of an antenna element for use in a movement element at the entrance or within a building may be in the range from 100 mm to 2000 mm, and a reasonable number of antenna elements in a line array may be in the range from 4 to 2000.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
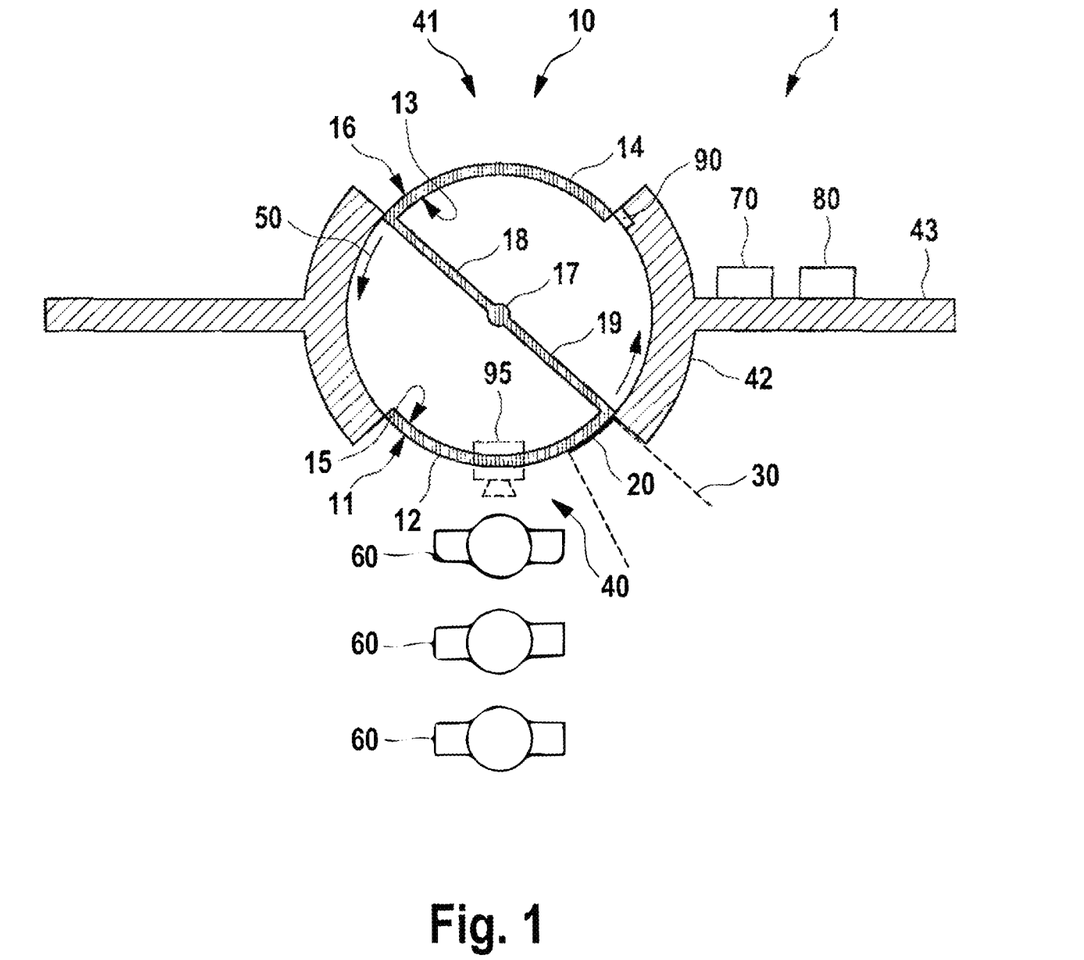
FIG. 1 shows a top view of a first embodiment of a security system according to the present disclosure including a revolving door.

Referring now to the drawings, wherein like reference numerals designate identical or corresponding parts throughout the several views, FIG. 1 shows a top view of a first embodiment of a security system 1 according to the present disclosure. This and the subsequent embodiments will use various doors as exemplary embodiments for an automatic movement element. It shall, however, be noted that the present disclosure is not limited to the use of doors. The security system 1 comprises an automatic door 10 that automatically opens and closes to which a line array 20 of antenna elements is mounted. In this embodiment the antenna elements are arranged next to each other along a line in vertical direction, i.e. in a direction substantially perpendicular to the direction of movement of the door 10. Preferably, for scanning of persons, the line array substantially extends from the floor up to a height of around 2 meters.

In this embodiment the antenna elements mounted to an outer surface 11 of one wing 12 of the door 10, but in other embodiments other line arrays of antenna elements may be mounted to both outer surfaces 11, 13 of both wings 12, 14 of the door 10 and/or to the inner surface(s) 15, 16 of one or both wings 12, 14 of the door 10 to increase the screening area, the speed of scanning and the reliability (e.g. by having redundant data that may e.g. be used for double checks or plausibility checks). Further, also to the inner wings 18, 19 one or more line arrays, e.g. one line array on each surface of each inner wing 18, 19, may be mounted, particularly in other embodiments of a revolving door that do not have any outer wings 12, 14 but only inner wings 18, 19. The people 60 are then mainly scanned while walking through the door 10.

The antenna elements of the line array 20 transmit electromagnetic radiation to and receive scattered electromagnetic radiation from a screening area 30 that is arranged outside of the door 10. Said screening area 30 moves together with the line array 20 of antenna elements around the central door axis 17 when the door 10 is automatically revolving so that the areas in front of both door openings 40, 41. The door 10 revolves in the direction indicated by arrows 50 within a housing 42 that is generally mounted to a wall 43.

Figure 4:
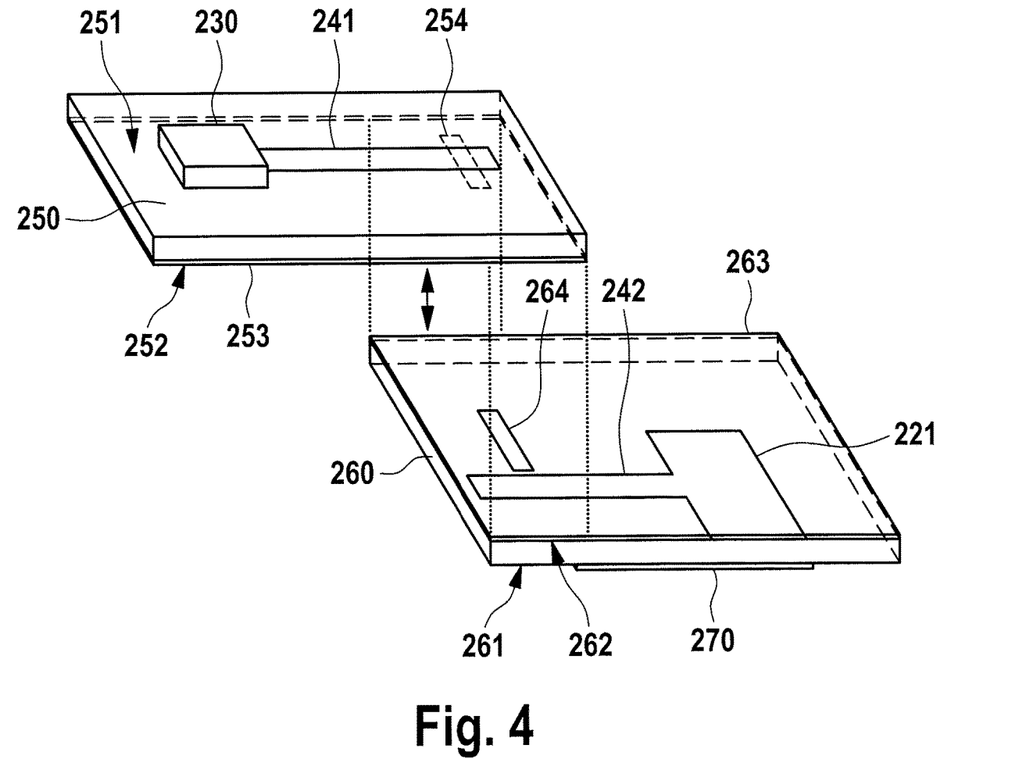
FIG. 4 shows a perspective view of an exemplary implementation of parts of a security device according to the present disclosure.

An embodiment of such a line array 20 of antenna elements is shown in FIG. 4 and will be explained in detail below. The antenna elements receive electromagnetic radiation that is scattered back from objects within the screening area 30, e.g. from persons 60 queuing up in front of the door 10. In this way, the people 60 are automatically scanned.

The system 1 further comprises a controller 70 configured to control said antenna elements to transmit electromagnetic radiation and to receive scattered electromagnetic radiation at a plurality of positions of the automatic door 10, i.e. while the automatic door 10 is revolving. Still further, the system 1 comprises a processor 80 configured to process scattered electromagnetic radiation received at a plurality of positions of the automatic door 10 and to generate image information of the screening area 30 using position information about the plurality of positions of the automatic door 10 at which scattered electromagnetic radiation is received and used for processing.

The controller 70 and processor 80 are schematically shown in FIG. 1. They may e.g. be implemented by a common processing apparatus or computer and may be arranged at various positions, for instance outside of the door 10 or integrated into parts of the door 10 (e.g. together with other electronics or mechanics needed for moving the door). The required connection means for connecting the controller 70 and the processor 80 with the line array 20 are not shown in FIG. 1. These connection means may e.g. be implemented by conventional wires or wireless transmission means. The output of the processor 80 may be coupled to a central surveillance system or alarm system of the building so that the generated images may be displayed for visual inspection or may be automatically checked e.g. for suspicious items like weapons or bombs carried by a person entering the building in which case an alarm may be issued.

Such type of doors 10 are typically made of optically transparent material such as, glass, acryl or any other polymer based material. In order to embed the line array 20 of antenna elements smoothly into the geometry of the door 10, the antenna elements are preferably transparent. Optically transparent antennas can, for instance, be fabricated by sputtering e.g. ITO structures or metal mesh structures on thin glass substrates or polymer films. Typically patch antennas are used. This can be single patch antenna or a series fed patch antennas. In case the patch antennas should have a curved shape, this needs to be considered in the design process.

For obtaining information about the positions of the line array 20 of antenna elements at which electromagnetic radiation is transmitted and received various embodiments exist. In one embodiment the rotational speed of the door 10 is measured and the position of the line array at any time is derived from this information by interpolation. An optical contact or a Reed contact 90 (or, more generally, a position sensor) may be employed for this purpose, as schematically indicated in FIG. 1. Said contact 90 creates an impulse for each revolution and can generally be mounted anywhere, where the door 10 passes by. Assuming the door 10 is rotating with constant velocity, the trajectory of the line array 20 can be derived. In another embodiment the position and/or speed of the door 10 may be obtained or derived directly from the motor and/or the motor controller of the door 10 which generally knows and/or controls the position and/or speed, e.g. to exactly stop the door at a predetermined stop position when the door is out of use and shall be closed.

In another embodiment a position sensor, e.g. a Hall sensor, is used instead of the optical contact or Reed contact. Such a position sensor provides a large number of impulses (increments) per revolution of the door 10 and can generally be mounted on the axis 17 of revolution of the door 10.

In another embodiment of the security system 1 an additional video camera 95 may be provided for monitoring the door 10, in particular the entrance areas, to obtain visual images which may be additionally used for various purposes in addition to the image data obtained from the data of the antenna elements. For instance, in case of an alarm the images delivered by the video camera 95 may be used to identify a potentially suspect person and/or to verify information derived from the data of the antenna elements. Further, sensor fusion of the optical image and the radar information can be applied.

Figure 2A:
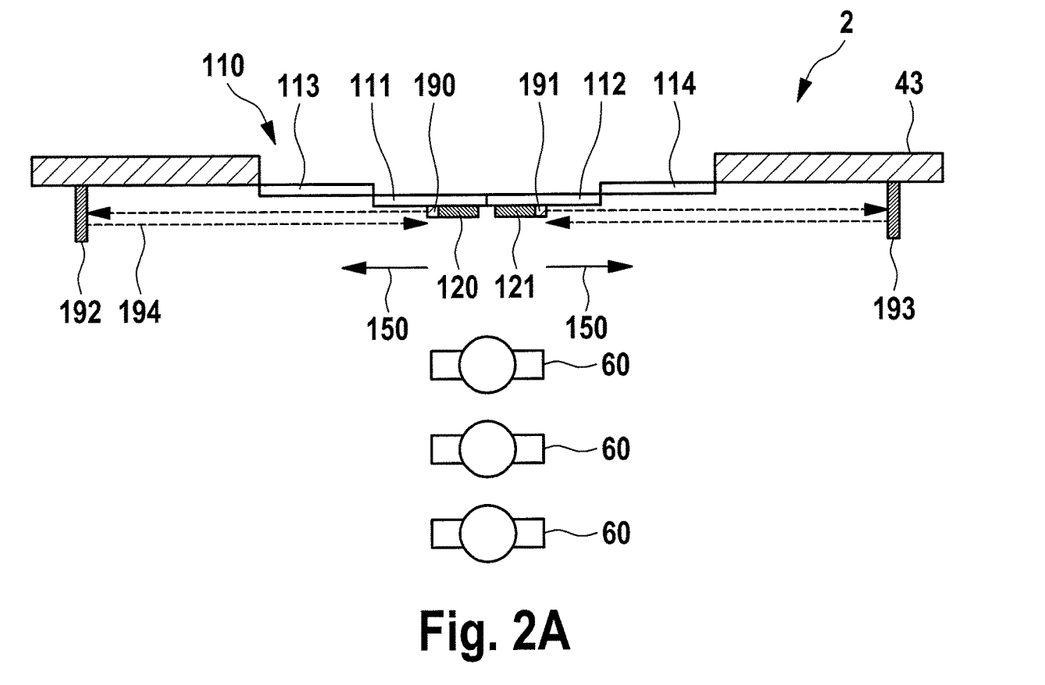
FIG. 2 shows top views of a second embodiment of a security system according to the present disclosure including a sliding door in two different states.
Figure 2B:
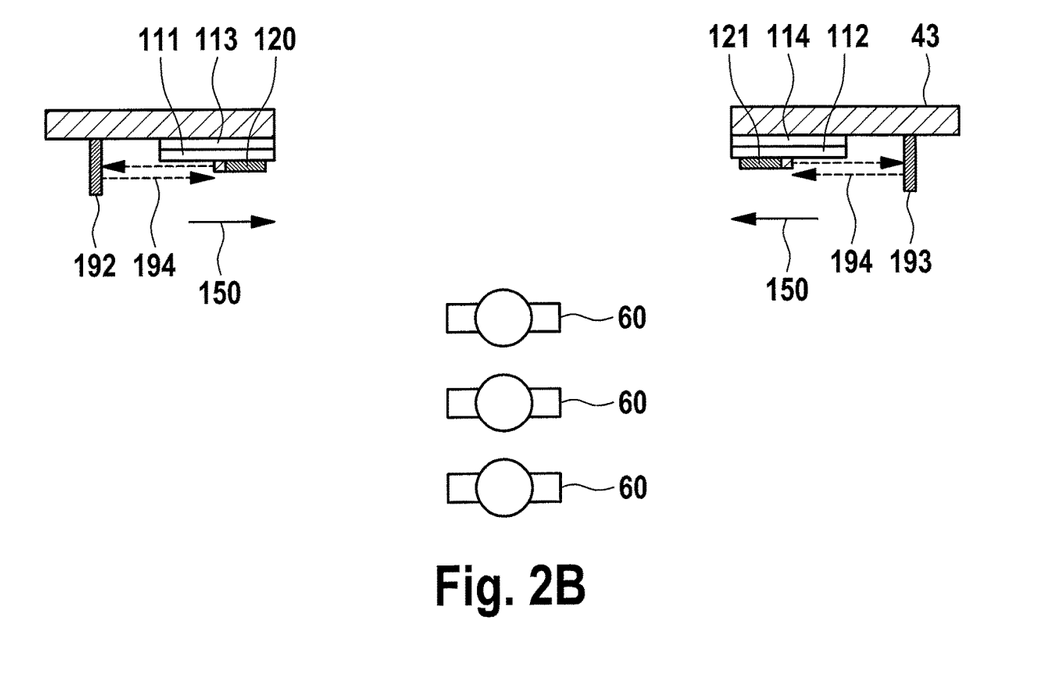

FIG. 2 shows top views of a second embodiment of a security system 2 according to the present disclosure in two different states. This security system 2 uses an automatic planar sliding door 110 which is shown in a closed state (FIG. 2A) and in an open state (FIG. 2B).

The door 110 comprises e.g. four wings 111, 112, 113, 114 (but may also comprise as smaller or larger number of wings, e.g. can also comprise two or six wings) which are sliding automatically in the movement direction 150 when the door 110 opens and closes. Two line arrays 120, 121 of antenna elements are arranged on the two inner wings 111, 112 which, when the door 110 opens, are moved along a straight line.

In an embodiment the movement speed of the wings of the door 110 and, thus, of the two line arrays 120, 121 of antenna elements is identified by one or more laser based distance sensors 190, 191, mounted e.g. to one or more of the wings of the door 110 (here to the wings 111, 112 next to the line arrays 120, 121). Corresponding optical reflectors 192, 193 are mounted at a fixed position on the wall 43 beside the door 110. The distance to these static reflectors 192, 193 is generally measured periodically by use of the laser rays 194 emitted by the sensors 190, 191 and received back from the reflectors 192, 193. The measured signals are then used to compute the speed and to interpolate the exact position of the door 110 at any time or at least at the times when electromagnetic radiation is transmitted and received, or at which a received signal is sampled and used for processing and generating an image of the screening area. By using such a laser distance meter 190, 191 as position sensor, the line array of antenna elements including all the required electronics for feeding and control of the antenna elements as well as the processor (together forming a security device which is sometimes also referred to as radar sensor) can be retrofitted to any existing sliding door 110.

The people 60 located in front of the door 110 can be scanned during the opening movement of the door 110 as well as during the closing. However, it is more likely that people 60 are queuing in front of the door 110, when it is opening the entrance.

Also in case of a planar sliding door 110 the antenna elements are preferably transparent. The controller and the processor are not shown in FIG. 2; the same information provided above with respect to these elements in the context of FIG. 1 hold.

Figure 3:
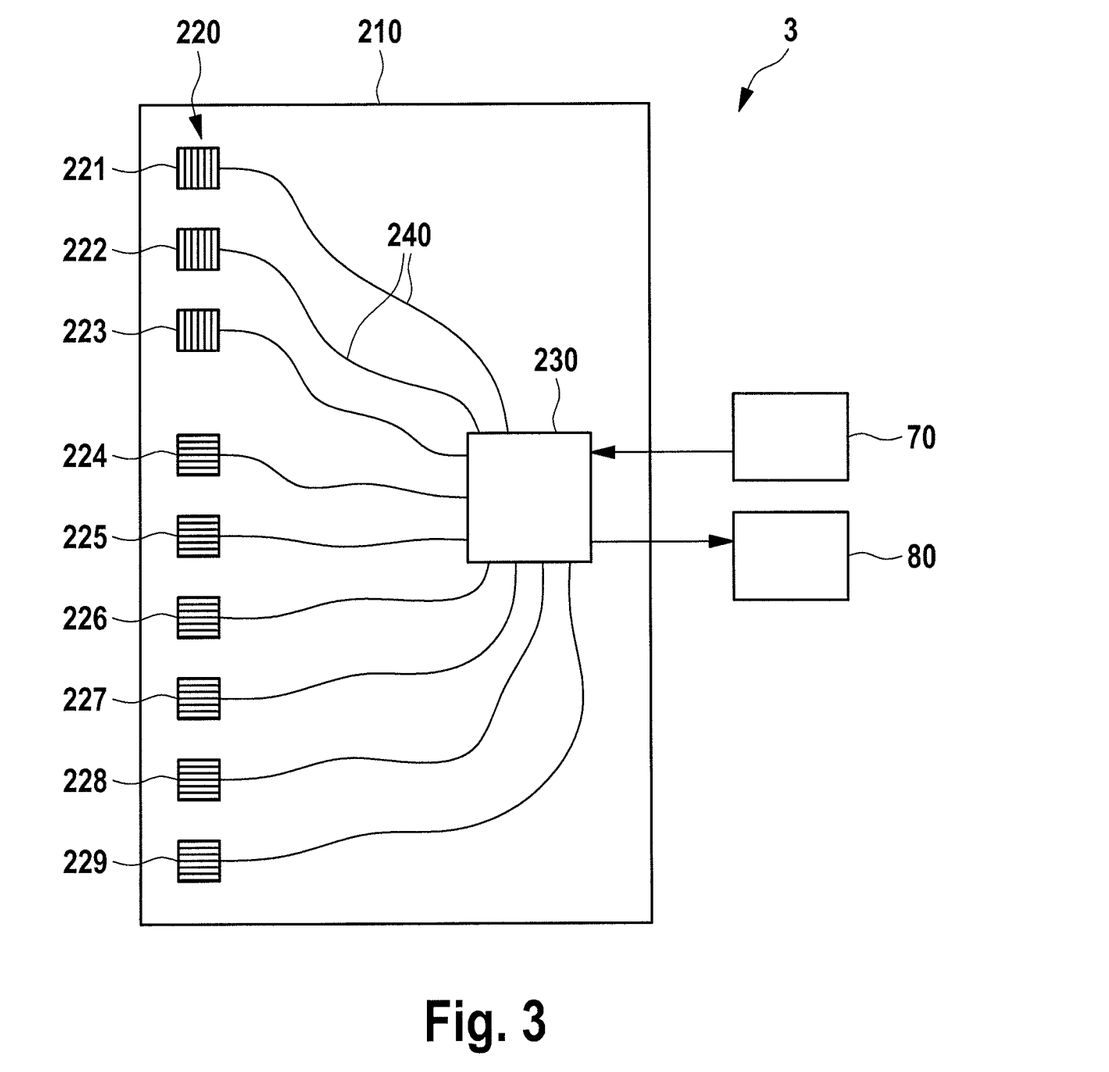
FIG. 3 shows a front view of an embodiment of a security device according to the present disclosure.

FIG. 3 shows a front view of an embodiment of a security device 3 according to the present disclosure. It comprises a line array 220 of a number of antenna elements 221-229, high frequency (RF) circuit 230 (also called RF electronics) configured to feed said antenna elements 221-229 and to receive signals from said antenna elements 221-229, the controller 70 and the processor 80. Microstrip lines 240 couple said high frequency circuit 230 to said antenna elements 221-229 through a via-less interconnection between an optically translucent substrate of the antennas and a PCB carrying the RF circuit 230.

In an embodiment all antenna elements 221-229 transmit and receive electromagnetic radiation, preferably in the wavelength range of radar imaging, in particular the millimeter and micrometer wavelength range. In other embodiments, some antenna elements (e.g. 221-223) are transmit antenna elements and other antenna elements (e.g. 224-229) are receive antenna elements.

The line array 220, the RF circuit 230 and the microstrip lines 240 are mounted to a planar door 210, which may be a wing of a planar sliding door as shown in FIG. 2 and that automatically moves along a linear path or a hinged door that is hinged to a wall and that automatically opens and closes by swiveling around the hinge.

Mounting means are preferably provided for mounting the line array 220 to the automatic door 210. Such mounting means may be any fixation means or elements for fixing the antenna elements to the door 210, such as glue or an (optically translucent or transparent) substrate or foil carrying the antenna elements so that they can be fixed to a door 210. The RF circuit is preferably carried by a PCB. More details in this respect will be provided below with reference to FIG. 4.

The linear array of antenna elements (typically planar patch antennas) may be very large. In principle it can have a height larger than 2 m. The antenna elements form a linear vertically aligned array, which can be used for beamforming. The array can be fully populated or sparse. For efficient beamforming using linear arrays several forms of multiple-input multiple-output (MIMO) topologies may be used. The arrangement depicted in FIG. 3 may be seen as an example. Due to the very large aperture size in the vertical dimension a high spatial resolution for the imaging can be obtained.

In order to increase the resolution in the horizontal dimension, the SAR principle can be employed. If the array is moved a large virtual aperture is created, by sampling the radar data at different positions. This technique reduces the number of transmit and receive channels significantly compared to a 2D array.

SAR is a radar technique that has originally been developed for military and non-military airborne systems, e.g. air- and spacecrafts. The SAR principle specifically makes use of the relative motion between a moving radar antenna and its target region to provide distinctive long-term coherent-signal variations that are exploited to obtain a finer spatial resolution than conventional beam-scanning radar systems. The SAR-principle requires a single antenna or an array of multiple antennas that repeatedly illuminate a target scene with radio waves at wavelengths in the range of one meter down to several millimeters or even lower. During scanning the antenna array is moved perpendicular to the scanning direction. The movement direction of the antenna array is usually denoted as azimuth direction, whereas the perpendicular coordinates are denoted as elevation and range, respectively. During the movement of the radar antenna array reflected radar radiation (echo waveforms) is successively received at different antenna positions, which are finally used to reconstruct a radar image of the target scene based on joint processing of the obtained information (by the distributed measurements). Due to the movement of the radar antenna array the aperture is therefore "synthetically" prolonged compared to Real Aperture Radar systems (RAR) with still-standing radar antenna arrays.

FIG. 4 shows a perspective view of an exemplary implementation of parts of a security device according to the present disclosure. The RF circuit 230 (e.g. a MMIC) is located in this embodiment on a first surface 251 of a RF PCB 250 (also called RF substrate). This PCB 250 is generally not optically transparent and may thus be designed for small size. On the same surface 251 of the PCB 250 a microstrip line 241, which is part of the microstrip line 240 schematically shown in FIG. 3, is provided. On the opposite surface 252 of the PCB 250 a ground plane 253 is arranged. Both the microstrip line 241 and the ground plane 253 are e.g. made of copper.

On a first surface 261 another substrate 260, which is e.g. made of quartz of fused silica or a polymer foil such as e.g. polyethylene naphthalate (PEN) and which is preferably transparent, the linear array of (preferably transparent or translucent) antenna elements, represented in FIG. 4 by a single planar antenna element 221, is arranged. On the same surface 261 of the substrate a microstrip line 242, which is also part of the microstrip line 240 schematically shown in FIG. 3, is provided. On the opposite surface 262 of the substrate 260 a ground plane 263 is arranged. The microstrip line 242, the planar antenna element 221 and the ground plane 263 are preferably made of a substantially transparent or translucent material, e.g. are made of ITO or a metal mesh.

Further, in order to interconnect the mictrostrip lines 241 and 242 (also called antenna feed lines) and, thus, to connect the RF circuit 230 and the antenna element 221, a microstrip based transition as shown in FIG. 4 may be used. The RF signal is coupled via a slot 254, 264 in the ground planes 253, 263 (which form a common ground plane, when the PCB 250 and the substrate 260 are combined) from the microstrip line 241 on the PCB 250 to the microstrip line 242 on the substrate 260 and vice versa. For this interconnection no vias are needed. The PCB 250 and the substrate 260 only need to be laminated or tightly pressed together.

As mentioned above, for mounting the line array 220 of antenna elements to the automatic door mounting means are preferably provided. Such mounting means 270 are schematically shown on the lower surface 261 of the substrate 260. Such mounting means may be implemented as glue or any other sticky or fixation material which allows retrofitting an existing door with such a security device. In other embodiments the substrate or the antenna elements may be directly deposited into the door while fabricating the door, e.g. may be directly sputtered onto or in any other way integrated into a glass wing of a door.

The RF circuit 230 can be powered by a cable. The data interface to the controller, the processor and/or a visualization system may be wired or wireless.

Figure 5:
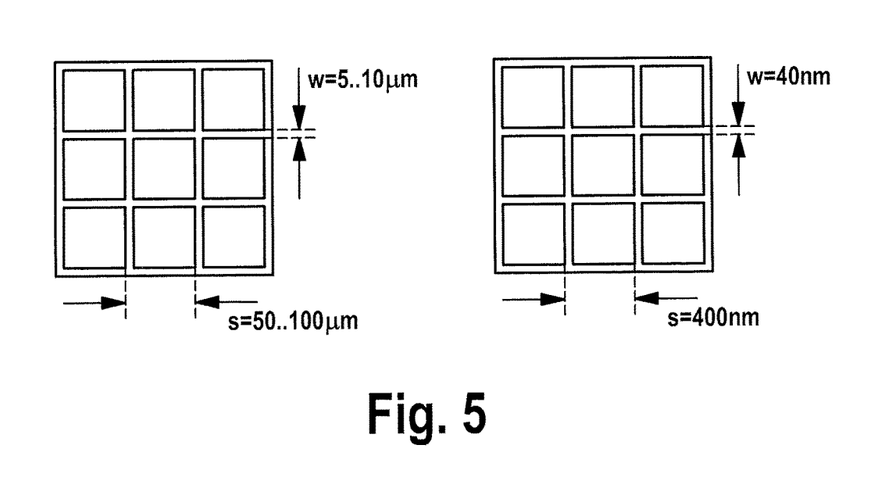
FIG. 5 shows two exemplary wire grids for use as antenna.

ITO (indium tin oxide) can be fabricated as thin film (100 . . . 2000 nm thickness) with a good optical transparency. In the mm-wave frequency range the skin depth in ITO is a few μm, which is much more than the typical film thickness of a few 100 nm. Hence, there may be losses (more than 30 dB/cm on a microstrip line). Accordingly, in another embodiment the planar patch antennas made of ITO are replaced by wire meshes made of a good electric conductor (e.g. gold or copper). The grid parameters can either be macroscopically small like the heating in a windscreen of a car or electrically small compared to the wavelength of light in order to be really invisible. FIG. 5 shows two embodiments for such wire meshes.

The transparency of such a wire mesh is generally determined by:

$$T = 1 - \frac{w}{0.5s}$$

The equivalent sheet resistance of such a wire mesh is generally determined by:

$$R_\blacksquare = \frac{1}{\sigma t} \cdot \frac{s}{w}$$

Figure 6A:
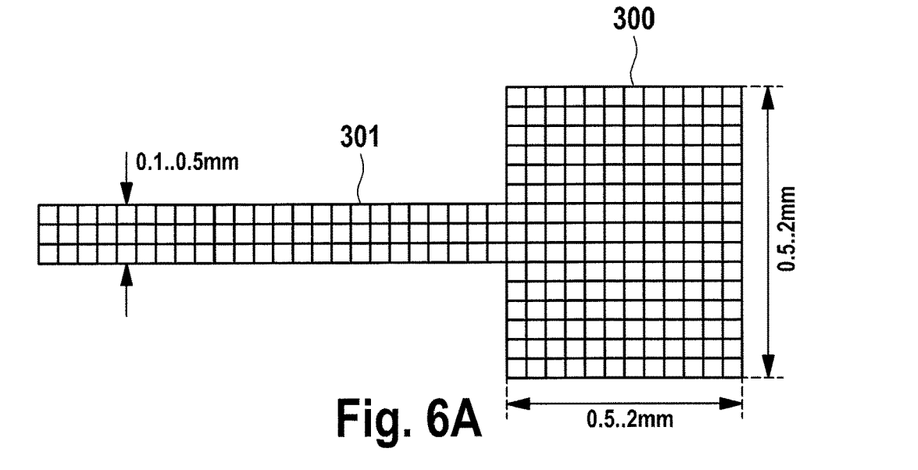
FIG. 6 shows three exemplary implementations of a patch antenna.
Figure 6B:
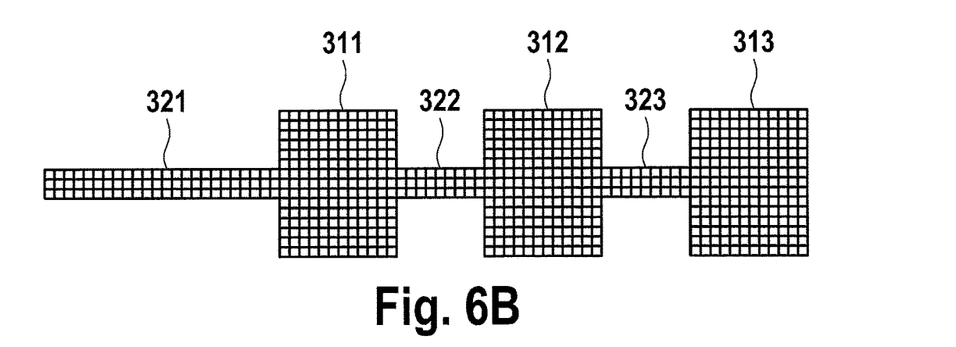
Figure 6C:
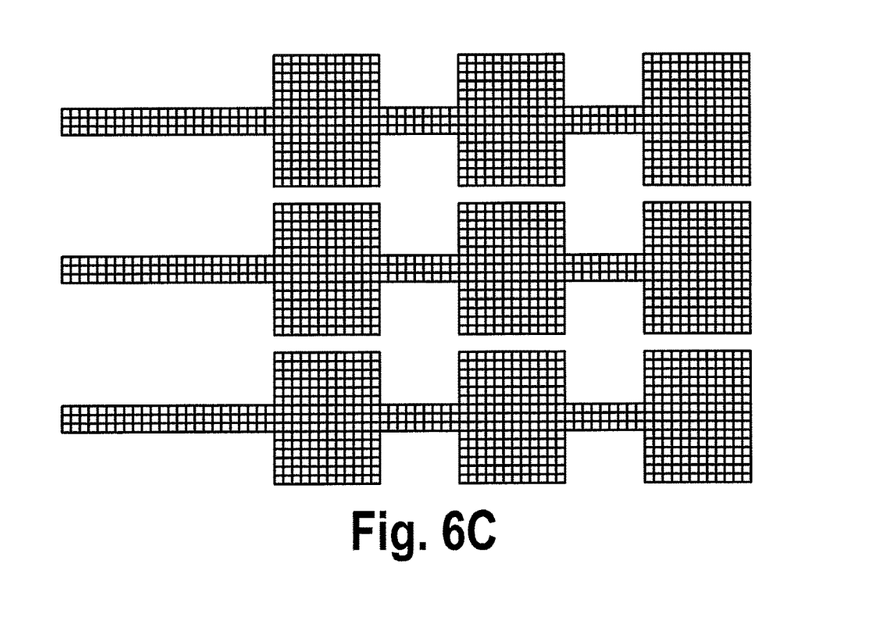

Any antenna structure (including microstrip line structures) can be represented by a wire mesh as illustrated in FIG. 6A showing a single patch antenna element 300 and the associated microstrip line 301. In order to achieve a sharper antenna beam in the direction of movement of the line array of antenna elements, a series of fed patch antenna arrays can be used as illustrated in FIGS. 6B and 6C. FIG. 6B shows a single series of three coupled patch antenna sub-elements 311, 312, 312 coupled in series by associated microstrip lines 321, 322, 323. FIG. 6C shows several of such series shown in FIG. 6B forming a 1D array of patch antennas.

The proposed security system according to the present disclosure can be used for various applications and may also complement a video camera used in conventional security systems or monitoring systems. Some applications will be briefly addressed in the following.

The number of people passing through an entrance can be counted. The proposed security device can easily distinguish between a real person and the shadow of a person as the shadow has no radar cross section (RCS).

Further, the distance of people and objects can be measured employing e.g. the generally known frequency modulated continuous wave (FMCW) principle. The beat frequency refers to the distance. For a mm-wave based security device exhibiting a bandwidth of e.g. 10 GHz, the range resolution would be 15 cm. It does not depend on the distance to the target. A stereoscopic optical camera could not achieve this accuracy for far away objects.

The security device can see through smoke, fog and dust. It can even see through objects (e.g. curtains or walls made of cardboard or wood). Thus it can see objects, which an optical sensor can not see.

The micro-doppler signature of moving targets can be detected. Using the micro-doppler signature objects can be classified and distinguished from each other (animals, humans, wheelchairs, baby strollers, etc.). Micro-doppler analysis can also be used to separate two overlapping persons standing behind each other. Micro-doppler analysis basically means the evaluation of the Doppler frequency in the beat frequency domain of a FMCW radar, which originates from the movement of a target. The way it moves creates a specific Doppler spectrum, which allows classification of different types of targets. For example the Doppler spectrum of a moving dog looks different than that of a moving human.

Figure 7:
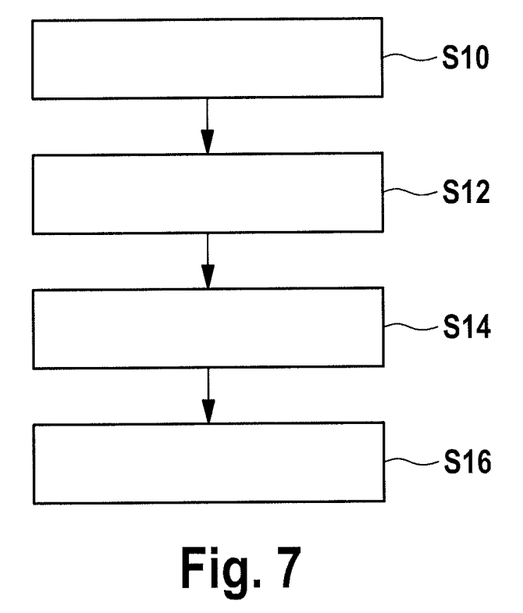
FIG. 7 shows a flow chart illustrating a security method according to the present disclosure.

FIG. 7 shows a flow chart illustrating a security method according to the present disclosure. A first step S10 comprises transmitting electromagnetic radiation by a line array of antenna elements mounted to an automatic door that automatically opens and closes, said electromagnetic radiation being transmitted to a screening area in front of and/or behind the automatic door. A second step S12 comprises receiving scattered electromagnetic radiation scattered back from an object from the screening area. A third step S14 comprises controlling said antenna elements to transmit electromagnetic radiation and to receive scattered electromagnetic radiation at a plurality of positions of the automatic door. A fourth step S16 comprises processing scattered electromagnetic radiation received at a plurality of positions of the automatic door and generating image information of the screening area using position information about the plurality of positions of the automatic door at which scattered electromagnetic radiation is received and used for processing. The third and fourth steps S14, S16 may form a separate method which may preferably be implemented in software running on a processing apparatus or computer.

Figure 8:
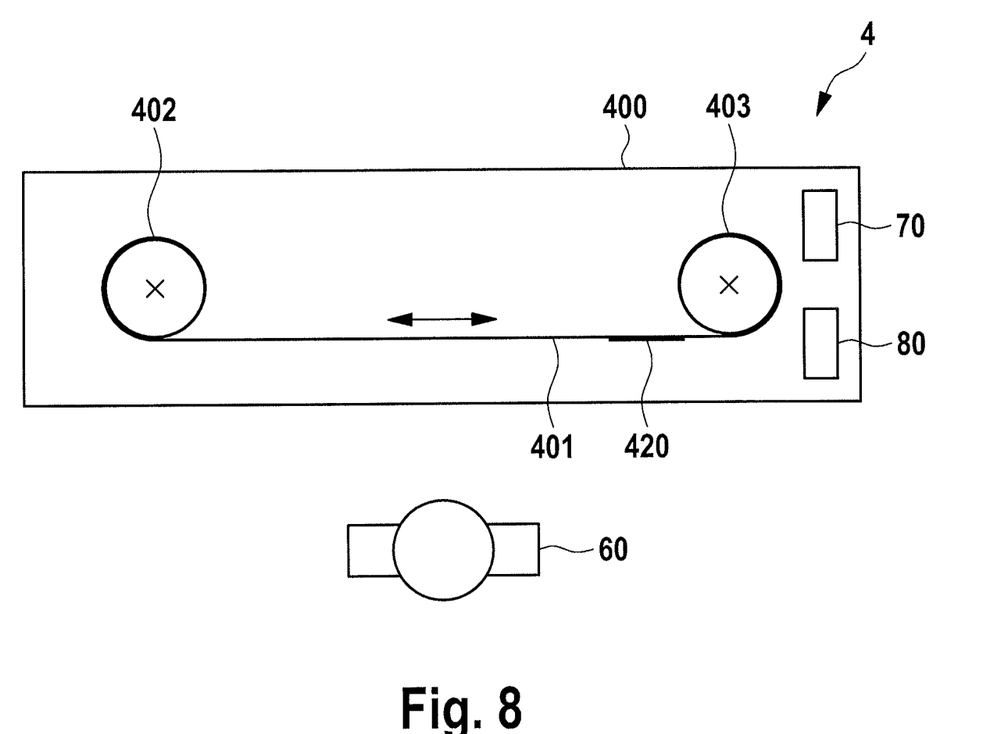
FIG. 8 shows a top view of another embodiment of a security system according to the present disclosure including an advertisement board.

FIG. 8 shows a top view of another embodiment of a security system 4 according to the present disclosure including an advertisement board. It comprises the (conventional) housing 400 that is partly transparent, e.g. made of glass, so that viewers can see the displayed advertisements that are printed on a roll of paper or film 401. The roll of paper or film is automatically rolled onto two rollers 402, 403 to alternately display two (or more) different advertisements. For this purpose mechanical movement means, e.g. electric motors (not shown) are provided that actuate the rollers 402, 403. According to the present disclosure it is proposed to mount (e.g. glue or print) one (or more) line array 420 of antenna elements onto the roll 401. The antenna elements are preferably transparent and arranged vertically above each other. When the roll 401 is rolled into one or the other direction the (one or more) line array 420 is move along with the paper or film so that a viewer 60 standing in front of the advertisement board gets automatically scanned. In this case the antenna and the RF circuit are preferably flexible in order to roll them on the roll. Further, a mechanism is preferably provided which moves the antennas and the RF circuit board from one side to the other. When the rotational movement changes the direction (after showing a couple of different advertisements), the radar sensor is moved back to the initial position. Like in the other embodiments a controller 70 and a processor 80 are also provided, preferably within the housing 400. Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

It follows a list of further embodiments of the disclosed subject matter:

1. A security system comprising:
    an automatic door that automatically opens and closes,
    a line array of antenna elements configured to transmit electromagnetic radiation and to receive scattered electromagnetic radiation scattered back from an object, said line array being mounted to said automatic door to transmit electromagnetic radiation to and receive scattered electromagnetic radiation from a screening area in front of and/or behind the automatic door,
    a controller configured to control said antenna elements to transmit electromagnetic radiation and to receive scattered electromagnetic radiation at a plurality of positions of the automatic door, and
    a processor configured to process scattered electromagnetic radiation received at a plurality of positions of the automatic door and to generate image information of the screening area using position information about the plurality of positions of the automatic door at which scattered electromagnetic radiation is received and used for processing.

2. The security system as defined in embodiment 1,
    wherein said processor is configured to process scattered electromagnetic radiation received and to generate image information of the screening area by use of beamforming or synthetic aperture radio processing.
3. The security system as defined in any preceding embodiment,
    further comprising a contact sensor and/or a position sensor for sensing one or more positions and/or the movement speed of the automatic door.
4. The security system as defined in embodiment 3,
    wherein said contact sensor or said position sensor comprises an optical contact, a Reed contact and/or a Hall sensor.
5. The security system as defined in embodiment 3,
    wherein said position sensor comprises a laser distance sensor, wherein one or more optical reflectors are mounted to fixed reference positions and wherein said processor is configured to determine the positions of the automatic door at which scattered electromagnetic radiation is received and used for processing from measured distances between said laser distance sensor and said one or more optical reflectors.
6. The security system as defined in embodiment 3,
    wherein said processor is configured to determine the positions of the automatic door at which scattered electromagnetic radiation is received and used for processing from one or more sensed positions and/or the sensed movement speed.
7. The security system as defined in any preceding embodiment,
    wherein said antenna elements are substantially made of optically transparent material.
8. The security system as defined in embodiment 7,
    wherein said antenna elements are substantially made of glass, acryl or polymer-based material.
9. The security system as defined in any preceding embodiment,
    wherein said line array is mounted to one or both main surfaces of the door.
10. The security system as defined in any preceding embodiment,
    wherein said automatic door is a revolving door, a sliding door or a hinged door.
11. The security system as defined in any preceding embodiment,
    wherein said processor is configured to determine the distance, number and/or type of objects from the scattered electromagnetic radiation.
12. The security system as defined in any preceding embodiment,
    further comprising an optical camera configured to acquire optical images of the screening area, wherein said processor is configured to use said optical images for generating image information of the screening area and/or to determine the distance, number and/or type of objects.
13. The security system as defined in any preceding embodiment, further comprising
    a high frequency circuit configured to feed said antenna elements and to receive signals from said antenna elements, and
    microstrip lines coupling said high frequency circuit to said antenna elements, wherein said antenna elements are deposited on a transparent substrate, wherein said high frequency circuit and said antenna elements are coupled via said microstrip lines and through a slot in a common ground plane.
14. The security system as defined in any preceding embodiment,
    wherein said antenna elements are configured as configured as planar patch elements or wire grids, wherein an antenna element is configured by a single or multiple planar patch elements or wire grids coupled in series.

15. The security system as defined in any preceding embodiment,
wherein said line array comprises one or more transmit antennas and one or more receive antennas arranged along a line.

16. The security system as defined in any preceding embodiment,
wherein said antenna elements are configured to transmit electromagnetic radiation in the millimeter or micrometer wavelength range.

17. A security method comprising:
    transmitting electromagnetic radiation by a line array of antenna elements mounted to an automatic door that automatically opens and closes, said electromagnetic radiation being transmitted to a screening area in front of and/or behind the automatic door,
    receiving scattered electromagnetic radiation scattered back from an object from the screening area,
    controlling said antenna elements to transmit electromagnetic radiation and to receive scattered electromagnetic radiation at a plurality of positions of the automatic door, and
    processing scattered electromagnetic radiation received at a plurality of positions of the automatic door and generating image information of the screening area using position information about the plurality of positions of the automatic door at which scattered electromagnetic radiation is received and used for processing.

18. A security device for use in a security system as defined in embodiment 1, said security device comprising:
    a line array of antenna elements configured to transmit electromagnetic radiation and to receive scattered electromagnetic radiation scattered back from an object,
    mounting means configured to mount said line array to an automatic door that automatically opens and closes to transmit electromagnetic radiation to and receive scattered electromagnetic radiation from a screening area in front of and/or behind the automatic door,
    a controller configured to control said antenna elements to transmit electromagnetic radiation and to receive scattered electromagnetic radiation at a plurality of positions of the automatic door, and
    a processor configured to process scattered electromagnetic radiation received at a plurality of positions of the automatic door and to generate image information of the screening area using position information about the plurality of positions of the automatic door at which scattered electromagnetic radiation is received and used for processing.

19. A method for use in a security system as defined in embodiment 1, said method comprising:
    controlling antenna elements of a line array of antenna elements mounted to an automatic door that automatically opens and closes to transmit electromagnetic radiation to a screening area in front of and/or behind the automatic door and to receive scattered electromagnetic radiation from an object from the screening area at a plurality of positions of the automatic door, and
    processing scattered electromagnetic radiation received at a plurality of positions of the automatic door and generating image information of the screening area using position information about the plurality of positions of the automatic door at which scattered electromagnetic radiation is received and used for processing.

20. A non-transitory computer-readable recording medium that stores therein a computer program product, which, when executed by a processor, causes the method according to embodiment 19 to be performed.

21. A computer program comprising program code means for causing a computer to perform the steps of said method according to embodiment 19 when said computer program is carried out on a computer.

The invention claimed is:

1. A security system comprising:
    a line array of antenna elements configured to transmit electromagnetic radiation and to receive scattered electromagnetic radiation scattered back from an object,
    an automatic movement element that automatically moves in a substantially horizontal direction between at least two positions to perform a predetermined function, said line array being mounted to said automatic movement element to transmit electromagnetic radiation to and receive scattered electromagnetic radiation from a screening area in front of and/or behind the automatic movement element and wherein said automatic movement element is an advertisement board that automatically changes between two or more advertisements that are printed on a roll of paper or film that is automatically rolled between two rollers to alternately display the two or more advertisements and wherein the line array of antenna elements is transparent and flexible and mounted onto the roll of paper or film and aligned in a substantially vertical direction and substantially perpendicular to the direction of movement of the automatic movement element,
    a controller configured to control said antenna elements to transmit electromagnetic radiation and to receive scattered electromagnetic radiation at a plurality of positions of the automatic movement element, and
    a processor configured to process scattered electromagnetic radiation received at a plurality of positions of the automatic movement element and to generate image information of the screening area using synthetic aperture radar processing and position information about the plurality of positions of the automatic movement element at which scattered electromagnetic radiation is received and used for processing.

2. The security system as claimed in claim 1,
wherein said processor is additionally configured to process scattered electromagnetic radiation received and to generate image information of the screening area by use of beamforming.

3. The security system as claimed in claim 1,
further comprising a contact sensor and/or a position sensor, in particular an optical contact, a Reed contact or a Hall sensor, for sensing one or more positions and/or the movement speed of the automatic movement element.

4. The security system as claimed in claim 3,
wherein said position sensor comprises a laser distance sensor, wherein one or more optical reflectors are mounted to fixed reference positions and wherein said processor is configured to determine the positions of the automatic movement element at which scattered electromagnetic radiation is received and used for processing from measured distances between said laser distance sensor and said one or more optical reflectors.

5. The security system as claimed in claim 3,
wherein said processor is configured to determine the positions of the automatic movement element at which scattered electromagnetic radiation is received and used for processing from one or more sensed positions and/or the sensed movement speed.

6. The security system as claimed in claim 1, wherein said antenna elements are substantially made of glass, acryl or polymer-based material.

7. The security system as claimed in claim 1, wherein said line array is mounted to one or both main surfaces of the movement element.

8. The security system as claimed in claim 1, wherein said processor is configured to determine the distance, number and/or type of objects from the scattered electromagnetic radiation.

9. The security system as claimed in claim 1, further comprising an optical camera configured to acquire optical images of the screening area, wherein said processor is configured to use said optical images for generating image information of the screening area and/or to determine the distance, number and/or type of objects.

10. The security system as claimed in claim 1, further comprising
a high frequency circuit configured to feed said antenna elements and to receive signals from said antenna elements, and
microstrip lines coupling said high frequency circuit to said antenna elements,
wherein said antenna elements are deposited on a transparent substrate, wherein said high frequency circuit and said antenna elements are coupled via said microstrip lines and through a slot in a common ground plane.

11. The security system as claimed in claim 1, wherein said antenna elements are configured as planar patch elements or wire grids, wherein an antenna element is configured by a single or multiple planar patch elements or wire grids coupled in series.

12. The security system as claimed in claim 1, wherein said line array comprises one or more transmit antennas and one or more receive antennas arranged along a line.

13. The security system as claimed in claim 1, wherein said antenna elements are configured to transmit electromagnetic radiation in the millimeter or micrometer wavelength range.

14. A security method comprising:
transmitting electromagnetic radiation by a line array of antenna elements mounted to an automatic movement element that automatically moves in a substantially horizontal direction between at least two positions to perform a predetermined function, said electromagnetic radiation being transmitted to a screening area in front of and/or behind the automatic movement element and wherein said automatic movement element is an advertisement board that automatically changes between two or more advertisements that are printed on a roll of paper or film that is automatically rolled between two rollers to alternately display the two or more advertisements and wherein the line array of antenna elements is transparent and flexible and mounted onto the roll of paper or film and aligned in a substantially vertical direction and substantially perpendicular to the direction of movement of the automatic movement element,
receiving scattered electromagnetic radiation scattered back from an object from the screening area,
controlling said antenna elements to transmit electromagnetic radiation and to receive scattered electromagnetic radiation at a plurality of positions of the automatic movement element, and
processing scattered electromagnetic radiation received at a plurality of positions of the automatic movement element and generating image information of the screening area using synthetic aperture radar processing and position information about the plurality of positions of the automatic movement element at which scattered electromagnetic radiation is received and used for processing.

15. A security device for use in a security system as claimed in claim 1, said security device comprising:
a line array of antenna elements configured to transmit electromagnetic radiation and to receive scattered electromagnetic radiation scattered back from an object,
mounting means configured to mount said line array to an automatic movement element that automatically moves in a substantially horizontal direction between at least two positions to perform a predetermined function to transmit electromagnetic radiation to and receive scattered electromagnetic radiation from a screening area in front of and/or behind the automatic movement element and wherein said automatic movement element is an advertisement board that automatically changes between two or more advertisements that are printed on a roll of paper or film that is automatically rolled between two rollers to alternately display the two or more advertisements and wherein the line array of antenna elements is transparent and flexible and mounted onto the roll of paper or film and aligned in a substantially vertical direction and substantially perpendicular to the direction of movement of the automatic movement element,
a controller configured to control said antenna elements to transmit electromagnetic radiation and to receive scattered electromagnetic radiation at a plurality of positions of the automatic movement element, and
a processor configured to process scattered electromagnetic radiation received at a plurality of positions of the automatic movement element and to generate image information of the screening area using synthetic aperture radar processing and position information about the plurality of positions of the automatic movement element at which scattered electromagnetic radiation is received and used for processing.

16. A method for use in a security system as claimed in claim 1, said method comprising:
controlling antenna elements of a line array of antenna elements mounted to an automatic movement element that automatically moves in a substantially horizontal direction between at least two positions to perform a predetermined function to transmit electromagnetic radiation to a screening area in front of and/or behind the automatic movement element and to receive scattered electromagnetic radiation from an object from the screening area at a plurality of positions of the automatic movement element and wherein said automatic movement element is an advertisement board that automatically changes between two or more advertisements that are printed on a roll of paper or film that is automatically rolled between two rollers to alternately display the two or more advertisements and wherein the line array of antenna elements is transparent and flexible and mounted onto the roll of paper or film and aligned in a substantially vertical direction and substantially perpendicular to the direction of movement of the automatic movement element, and
processing scattered electromagnetic radiation received at a plurality of positions of the automatic movement element and generating image information of the screening area using synthetic aperture radar processing and position information about the plurality of positions of the automatic movement element at which scattered electromagnetic radiation is received and used for processing.

17. A non-transitory computer-readable recording medium that stores therein a computer program product, which, when executed by a processor, causes the method according to claim 16 to be performed.

\* \* \* \* \*